United States Patent [19]

Galan et al.

[11] Patent Number: 4,757,095
[45] Date of Patent: Jul. 12, 1988

[54] UTILIZATION OF LACTONES AND LACTAMS IN THE PREPARATION OF POLYURETHANE-POLYUREA PRODUCTS

[75] Inventors: Robert J. Galan, Southgate; Thirumurti Narayan, Grosse Ile, both of Mich.

[73] Assignee: BASF Corporation, Parsippany, N.J.

[21] Appl. No.: 59,919

[22] Filed: Jun. 9, 1987

Related U.S. Application Data

[63] Continuation-in-part of Ser. No. 890,084, Jul. 24, 1986, abandoned.

[51] Int. Cl.$^4$ ............................................. C08G 18/14
[52] U.S. Cl. ................................ 521/128; 12/146 B; 12/146 BP; 521/130; 521/159; 521/160; 521/161; 521/155; 521/166

[58] Field of Search ............... 521/128, 130, 159, 160, 521/161, 166, 155; 252/182; 12/146 B, 146 BP

[56] References Cited

U.S. PATENT DOCUMENTS 4,195,148  3/1980  Hagen .................................. 524/753
4,234,445  11/1980  Hagen .................................. 524/110

*Primary Examiner*—Maurice J. Welsh
*Attorney, Agent, or Firm*—Norbert M. Lisicki

[57] ABSTRACT

Lactones and lactams are utilized in the preparation of urethane modified prepolymers based on diphenylmethane diisocyanate, uretonimine-modified diphenylmethane diisocyanate. The prepolymers are then employed to prepare microcellular foams suitable for shoe soles and cast polyurethane products.

18 Claims, No Drawings

UTILIZATION OF LACTONES AND LACTAMS IN THE PREPARATION OF POLYURETHANE-POLYUREA PRODUCTS

This application is a continuation-in-part of application Ser. No. 890,084, filed July 24, 1986 and now abandoned.

BACKGROUND OF THE INVENTION

1. Field of the Invention

This invention relates to the preparation of polyurethane-polyurea elastomers. More particularly this invention relates to the utilization of lactones and lactams in the preparation of prepolymers based on diphenylmethane diisocyanate and uretonimine-modified diphenylmethane diisocyanate with either a polyester polyol or a polyoxyalkylene polyether polyol. The prepolymers are employed in the preparation of improved polyurethane-polyurea products.

2. Description of the Prior Art

U.S. Pat. Nos. 4,195,148 and 4,234,445 teach the use of a lactone as a viscosity modifier in the preparation of polyurethanes.

It has been discovered that lactones and lactams act as freezing point depressants for isocyanate terminated prepolymers as well as improving the cold temperature flexibility of polyurethane-polyurea products prepared from these prepolymers. These prepolymers are especially useful in preparing polyurethane microcellular foam systems having enhanced properties for applications such as shoe soles, tires, machine parts, toys, and reaction injection molded products. These prepolymers are also useful in the manufacture of cast elastomer products such as wheels, car mats and the like.

SUMMARY OF THE INVENTION

The subject invention relates to a polyurethane or a polyurethane-polyurea composition comprising (a) a urethane-modified quasi-prepolymer comprising a mixture of diphenylmethane diisocyanate and uretonimine-modified diphenylmethane diisocyanate said mixture having from about 10 weight percent to about 30 weight percent free NCO, (b) a polyol selected from the group consisting of a polyester polyol and a polyoxyalkylene polyether polyol and a compound selected from the group consisting of a lactone having the formula:

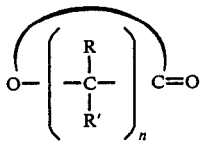

and a lactam having the formula:

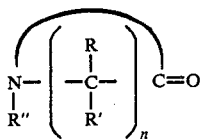

wherein R, R', and R" are H, alkyl, aryl, alkylaryl, heterocyclyl and cycloalkyl having 1 to 6 carbon atoms and n is an integer from 2 to 6, (c) an alkane or alkene diol or diamine chain extender, and (d) catalyst, blowing agent, water, and surfactant.

The polyurethane and the polyurethane-polyurea elastomers have unexpected and improved properties when compared to polyurethane elastomers which are prepared in the absence of either a lactone or a lactam. In particular, the elastomers exhibit good cold temperature flexibility.

DESCRIPTION OF THE PREFERRED EMBODIMENTS

In order to prepare the polyurethane-polyurea elastomers of the subject invention, an organic polyisocyanate is reacted with a polyol having an average molecular weight of 1000 to 10,000 containing two to eight active hydrogen atoms, as determined by the Zerewitinoff method, and incorporated with the lactone or lactam. Catalysts, blowing agents, fillers, surfactants, and various other ingredients may also be incorporated into the reaction mixture. The molded polyurethane and the polyurethane-polyurea elastomers are preferably prepared by the use of reaction injection molding or cast urethane techniques.

In preparing the polyurethane-polyurea elastomers of the subject invention, any conventional organic polyisocyanate, modified organic polyisocyanate, or quasi prepolymer can be used, as well as mixtures thereof. Representative conventional organic polyisocyanates correspond to the following formula:

R"(NCO)$_z$ wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein include, for example, aromatic diisocyanates such as 2,4-toluene diisocyanate, 2,6-toluene diisocyanate, mixtures of 2,4- and 2,6-toluene diisocyanate, crude toluene diisocyanate, 4,4'-diphenylmethane diisocyanate, 2,4'-diphenylmethane diisocyanate, mixtures of 4,4'- and 2,4'-diphenylmethane diisocyanate, polymethylene polyphenyl isocyanates, mixtures of diphenylmethane diisocyanates and polymethylene polyphenyl polyisocyanates, and the like; aromatic triisocyanates such as 4,4',4"-tri-phenylmethane triisocyanate, 2,4,6-toluene triisocyanates; aromatic tetraisocyanates such as 4,4'-dimethyldiphenylmethane-2,2',5,5'-tetraisocyanate, and the like; arylalkyl polyisocyanates such as xylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-diphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine.

As mentioned above, isocyanates which are modifications of the above isocyanates which contain carbodiimide, uretonimine, allophanate or isocyanurate structures may also be used. Quasi-prepolymers may also be employed. These quasi-prepolymers are prepared by reacting an excess of organic polyisocyanate or mixtures thereof with a motor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasi-prepolymers have a free isocyanate content of from about 10 percent to 30 percent by weight.

Preferably the organic polyisocyanates employed are diphenylmethane diisocyanate and uretonimine-modified diphenylmethane diisocyanate which are reacted with polyols to form quasi-prepolymers.

In order to prepare the polyurethane or the polyurethane-polyurea elastomers, the organic polyisocyanates are reacted with one or more compounds having an average molecular weight from 62 to 10,000 containing two to eight active hydrogen atoms as determined by the Zerewitinoff method described previously. Preferably the active hydrogen containing compounds have an average molecular weight from 1000 to 10,000. Examples of such compounds include, but are not limited to, hydroxyl-terminated polyesters; polyoxyalkylenepolyether polyols; graft polymer dispersions in polyoxyalkylenepolyether polyols; alkylene oxide adducts of organic compounds having at least two reactive hydrogen atoms such as amines and thiols; and hydroxy terminated acetals. These compounds will now be more specifically described.

Any suitable hydroxy-terminated polyester may be used such as are obtained, for example, from the reaction of polycarboxylic acids or polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of phenolic compounds such as bis-2-hydroxyethyl ether of hydroxyquinone, and the alkylene oxide adducts of the abovenamed polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyterminated polyester with only a portion of the components being a diamine such as ethylenediamine. The hydroxy-terminated polyester may also be a hydroxy-terminated polycaprolactone polyol.

Preferably the polyester polyol is an ester obtained by reacting adipic acid with ethylene glycol and 1,4-butanediol or with diethylene glycol alone having a hydroxyl number of about 40 to 120. In the former polyester diol the ratio of ethylene glycol to butanediol may range from about 1:1 to about 2.5:1.

Polyoxyalkylene ether polyols may also be used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran such as polytetramethylene ether glycols and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from 2 to 6 carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257-262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polymer dispersions in polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re 28,715), 3,304,273, 3,652,639, and 3,823,201 (Re 29,104), the disclosures of which are hereby incorporated by reference.

As was previously mentioned, other suitable polyols, which can be used in the reactive polyol composition of this invention, include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two —SH groups such as 1,2-ethanedithiol, 1,2-propanedithiol, 1,3-propanedithiol, and 1,6-hexanedithiol; and alkenethiols such as 2-butene-I,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

Oxyalkylated aromatic amines which may be employed as chain extenders in the preparation of the elastomers of the invention have the following structural formulae:

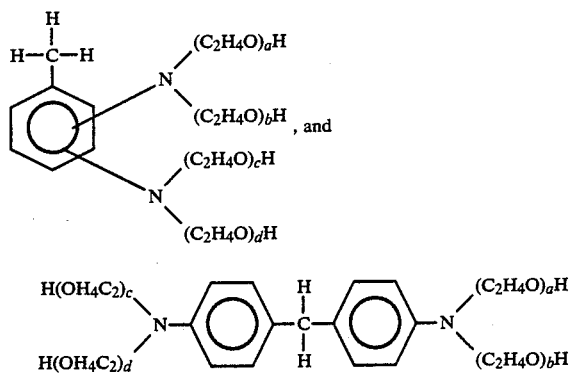

These are prepared by reacting a mixture of 2,4- and 2,6-toluenediamine isomers with from about two moles to about ten moles of ethylene oxide employing procedures well known to those skilled in the art. The 2,4'- and 4,4'-diaminodiphenylmethane oxyethylated products are produced in a similar fashion. The letters a, b, c, and d represent numerals from 0-10 provided the sum of a+b+c+d ranges from 2-10.

Other chain extenders employed in the present invention may have molecular weights of less than 400, preferably of 30 to 300, and preferably have 2 active hydrogen atoms. Examples of chain extenders include aliphatic and/or araliphatic diols having 2 to 14, preferably 2 to 6 carbon atoms such as ethylene glycol, 1,10-decanediol, diethylene glycol, dipropylene glycol, 1,4-butanediol, 1,4-butenediol, 1,6-hexanediol and bis(2-hydroxyethyl)hydroquinone.

Secondary aromatic diamines can also be used as chain extenders. Examples include N,N'-dialkyl-substituted aromatic diamines wherein the n-alkyl radicals have 1 to 20, preferably 1 to 4, carbon atoms such as N,N'-diethyl-, N,N'-di-secondary butyl-, N,N'-dicyclohexyl-4,4'-diaminodiphenylmethane and N,N'-di-secondary butylbenzidine. Other chain extenders include 3,3',5,5'alkyl-substituted 4,4'-diaminodiphenylmethanes such as 3,3',5,5'-t tramethyl-, -tetraethyl-, and -tetra-n-propyl-, tetraisopropyl 4,4'-diaminodiphenylmethane. Another group of chain extenders are dialkyl substituted toluenediamines such as 3,5-diethyl-2,4-toluenediamine, 3,5-diethyl-2,6-toluenediamine, 4,5-diethyl-2,3-toluenediamine and 5,6-diethyl-3,4-toluenediamine.

The lactones contemplated for use in the invention have the formula:

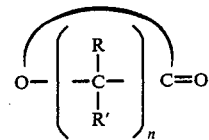

and lactams contemplated have the formula:

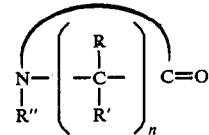

wherein R, R' and R" are H, alkyl, aryl, alkylaryl, heterocyclyl and cycloalkyl having 1 to 6 carbon atoms and n is an integer from 2 to 6. The lactones contemplated may be selected from the group consisting of $\beta$- and $\gamma$-butyrolactone, $\beta$- and $\gamma$- and $\delta$-valerolactone, $\alpha\gamma$-, $\beta\gamma$- and $\gamma\gamma$-dimethylbutyrolactone, $\beta$-propiolactone, $\epsilon$-caprolactone, and $\alpha$-ethyl-$\gamma$-methyl butyrolactone. The lactams are selected from the group consisting of 2-pyrrolidone, N-methylpyrrolidone, N-methyl-$\beta$-propiolactam, N-ethylpyrrolidone, N-acetylpyrrolidone, N-ethyl-2-piperidone, N-cyclohexyl-2-piperidone, N-butyl-2-piperidine, $\delta$-butyrolactam, $\epsilon$-caprotactam, and $\alpha$-laurolactam and 2-piperidone. The concentration of lactone or lactam is from about 0.1 weight percent to about 20 weight percent based on the weight of the prepolymer.

In addition to the previously described ingredients, other ingredients such as antistat or static dissipating agents, surfactants, fillers, pigments, blowing agents, and catalysts can be included in the preparation of the polyurethane and the polyurethane-polyurea products. These ingredients are usually added to the polyol before reaction with the polyisocyanate to form a resin component which is then reacted with the isocyanate component.

Surfactants which can be used include polyoxyalkylene derivatives of siloxane or the alkylene oxide adducts of organic compounds containing reactive hydrogen atoms such as the ethylene oxide adducts of alcohols, glycols and phenols. Generally, the surfactants are employed in amounts ranging from about 0.01 part to 5 parts by weight per 100 parts of polyol.

Conventional fillers for use herein include, for example, aluminum silicate, calcium silicate, magnesium silicate, calcium carbonate, barium sulfate, calcium sulfate, glass fibers, flaked glass, carbon black, and silica. The filler, if used, is normally present in an amount ranging from about 5 parts to 50 parts by weight per 100 parts of resin.

A pigment which can be used herein can be any conventional pigment heretofore disclosed in the art such as titanium dioxide, zinc oxide, iron oxide, antimony oxide, chrome green, chrome yellow, iron blue siennas, molybdate oranges, and organic pigments such as para reds, benzidine yellow, toluidine red, toners, and phthalocyanines.

Conventional blowing agents such as halohydrocarbons, hydrocarbons, water, and the like, can be employed herein in their conventional mode. Representative examples include halogenated hydrocarbons such as monochlorodifluoromethane, dichloromonofluoromethane, dichlorofluoromethane, and trichlorofluoromethane, and hydrocarbons such as propane and isobutane.

Any of the catalysts employed in the preparation of polyurethane foam can be employed in the subject invention. Representative of these catalysts include the tertiary amine catalysts such as triethylenediamine, also known as diazabicyclo-octane, ketimine, tetramethylenediamine, triethylenediamine, tetramethylenediamine, tetramethylquanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)dodecyl succinate, phenylmercuric benzoate, cadmium naphthenate, dibutyltin dilaurate and dibutyltin-di-2-ethylhexoate. Generally these catalysts will be employed in amounts ranging from about 0.01 part to 7.5 parts by weight based on the weight of the compound having an average molecular weight of 1000 to 10,000 containing two or more active hydrogen atoms.

In general, the polyurethane or the polyurethanepolyurea elastomers of the present invention are prepared by mixing together the ingredients mechanically and/or by the use of high pressure machinery. The ratio of reactants is such that from 0.7 equivalent to 1.4 equivalents of isocyanate is present per equivalent of active hydrogen atoms contained in the mixture of polyol and ethoxylated amine. Preferably from 0.9 equivalent to 1.15 equivalents of isocyanate is present per equivalent of active hydrogen atom. As was previously mentioned, the polyol compositions described herein for the preparation of polyurethanepolyurea microcellular foams are particularly useful for the preparation of molded products by reaction injection molding techniques.

The Examples which follow will illustrate in more detail the practice of this invention. They are not intended to limit the scope of its application. The parts referred to in the Examples are by weight unless otherwise specified, and the temperatures are in degrees centigrade unless otherwise specified.

The following abbreviations are used in the Examples:
Isocyanate A is 4,4'-diphenylmethane diisocyanate.
Isocyanate B is 25 percent uretonimine-modified 4,4'-diphenylmethane diisocyanate.
Polyol A is a polyester of adipic acid, ethylene glycol and butanediol having a hydroxyl number of 56.
Polyol B is a polyester of adipic acid and the diethylene glycol having a hydroxyl number of 45. Catalyst A is 33% triethylene diamine and 67% ethylene glycol.
Catalyst A is 33% triethylenediamine in 67% ethylene glycol.
Catalyst B is 33% triethylenediamine in 67% 1,4-butanediol.
Antistat A is Catafor F sold by Aceto Corporation.
Antistat B is Catafor PU sold by Aceto Corporation.
DC 193 is a silicone surfactant sold by Dow Corning Corporation.
F-113 is a chlorinated fluorinated hydrocarbon sold by duPont Corporation.
DETDA is diethyltoluene diamine chain extender sold by Ethyl Corporation.

EXAMPLES 1-6

The indicated quantities and ingredients in Table I were employed for the preparation of Examples 1-6. Molten Isocyanate A and γ-butyrolactone were charged into a reactor. The contents were agitated and heated to 80° C. Benzoyl chloride was added. The polyol was then added at a constant rate over a period of about 30 minutes. The reactor was then heated for 90 minutes at 80° C. The reactor was cooled to 60° to 65° C. and Isocyanate B was added and the contents blended for 15 minutes. The prepolymer product was cooled to room temperature and the physical properties were determined. Alternately, the γ-butyrolactone and the Isocyanate B were blended with the Isocyanate A and polyol reaction product. Evaluation of the prepolymers in a comparative manner indicates that prepolymers with incorporated γ-butyrolactone displayed superior low temperature storage stability.

EXAMPLES 7-9

Prepolymers of Examples 4, 5, and 6 and resin blends A and B were employed in the preparation of the shoe soles of Examples 7-9. The method of preparation of the prepolymers is the same as described in Examples 1-6.

The shoe soles were prepared by employing the prepolymers A and B and blends as follow. The prepolymers and resin blends were kept in holding tanks at temperatures of 35°-40° C. The components in the indicated amounts were dispensed through a mixing head of a F-20ST EMB machine at a rate of 55-70 grams per second into aluminum molds which were maintained at a temperature of 46°-54° C. The finished parts were demolded after 3 to 4 minutes. The results indicate the great improvement in Ross Flex for the shoe soles incorporating γ-butyrolactone. The formulation and properties of the polyurethane shoe sole finished parts are summarized in Table II.

|  | pbw |
|---|---|
| Resin Blend A | |
| Polyol A | 86.2 |
| Ethylene Glycol | 7.25 |
| Catalyst A | 2.21 |
| DC 193 | 0.15 |
| Water | 0.29 |
| F-113 | 1.50 |
| Antistat A | 2.40 |
| Resin Blend B | |
| Polyol A | 41.28 |

-continued

| | pbw |
|---|---|
| Polyol B | 45.00 |
| Ethylene Glycol | 6.92 |
| Catalyst A | 2.05 |
| DC 193 | 0.15 |
| Water | 0.30 |
| F-113 | 1.50 |
| Antistat A | 2.80 |

TABLE I

| Example | 1 | 2 | 3 | 4 | 5 | 6 |
|---|---|---|---|---|---|---|
| Formulation, pbw | | | | | | |
| Isocyanate A | 2036 | 2026 | 2036 | 560 | 53.1 | 53.1 |
| Isocyanate B | 218 | 218 | — | 60 | 5.7 | 5.7 |
| γ-butyrolactone | 364 | 182 | 364 | — | 5.2 | 5.2 |
| Polyol A | 1381 | 1381 | 1381 | 380 | 36.0 | — |
| Polyol B | — | — | — | — | — | 36.0 |
| Benzoyl chloride | 0.11 | 0.11 | 0.11 | 0.03 | 0.003 | 0.003 |
| Physical Properties | | | | | | |
| % free NCO | 17.0 | 18.0 | 16.7 | 19.1 | 18.1 | 18.0 |
| Viscosity, mPas (25° C.) | 572 | 780 | 598 | 1243 | 744 | 817 |
| Storage stability at 0° C. | >7 days | ~3 days | ~12 hrs. | <12 hrs. | >7 days | >7 days |

TABLE II

| | Example | | |
|---|---|---|---|
| | 7 | 8 | 9 |
| Prepolymer of Example 5 | 90.0 | — | — |
| Prepolymer of Example 5 | — | 94.7 | — |
| Prepolymer of Example 6 | — | — | 91.00 |
| Resin Blend A | 100.0 | 100.0 | — |
| Resin Blend B | — | — | 100.0 |
| Isocyanate Index | 100 | 100 | 100 |
| Physical Properties | | | |
| Tensile Strength, kPa | 7585 | 6895 | 5516 |
| % Elongation | 680 | 700 | 450 |
| Tensile Modulus, kPa | | | |
| 100% Elongation | 2069 | 1827 | 1448 |
| 200% Elongation | 2861 | 2517 | 2186 |
| 300% Elongation | 3620 | 3172 | 3151 |
| Skin Tear, N/M | 8930 | 8755 | — |
| Foam Tear, N/M | 5953 | 5428 | — |
| Die C Tear, N/M | 28,191 | 23,565 | 23,991 |
| Ross Flex (Cycles to failure) | | | |
| @ −28.9° C. | 30K | 64K | 18.5K |
| @ −17.8° C. | 150K | >300 K* | — |
| Shore A, Hardness | 70-75 | 65-70 | 52-55 |
| Taber Abrasion mg. loss/1000 cycles | 42 | 34 | — |

*estimated

A comparative evaluation of the properties of shoe sole products shown in Table II indicates that the prepolymers having γ-butyrolactone incorporated therein produced foams displaying superior low temperature flex (Ross Flex) properties.

EXAMPLES 13-24

Examples 13-24 were prepared employing hand mix procedures. The isocyanate prepolymers of Table III (Examples 10, 11 and 12) were prepared employing the procedure of Examples 1-6. The isocyanate prepolymer and the resin component were maintained at temperatures of 26° C. and 37° C., respectively. The indicated amounts were weighed into one-quart mixing cups. The mixture was stirred for eight seconds at high speed (2000 RPM). The mixture was then poured into an open aluminum mold maintained at about 50° C. The mold was closed and the product demolded after 3-4 minutes. The physical properties were then determined and summarized in Table IV. In a comparative evaluation of the properties of the products summarized in Table IV, it is clearly evident that polyurethane parts produced using Prepolymer B of the present invention having γ-butyrolactone or N-methylpyrrolidone incorporated therein displayed superior low temperature service properties (Ross Flex properties).

TABLE III

| Example | 10 | 11 | 12 |
|---|---|---|---|
| Formulation, pbw | | | |
| Isocyanate A | 53.7 | 53.1 | 53.1 |
| Isocyanate B | 6.0 | 5.7 | 5.9 |
| q-butyrolactone | — | 5.0 | — |
| Polyol A | 40.3 | 36.0 | 36.0 |
| N—methylpyrrolidone | — | — | 5.2 |
| Physical Properties | | | |
| % free NCO | 17.9 | 18.0 | 17.9 |
| Viscosity, mPas (25° C.) | 1740 | 735 | 772 |
| Storage Stability at 0° C. | <12 hrs. | >7 days | >15 days |

TABLE IV

| | | | | | Examples 15-24 | | | | | | | |
|---|---|---|---|---|---|---|---|---|---|---|---|---|
| Examples | 13 | 14 | 15 | 16 | 17 | 18 | 19 | 20 | 21 | 22 | 23 | 24 |
| Formulation, pbw | | | | | | | | | | | | |
| Resin Component | | | | | | | | | | | | |
| Polyol A | 86.5 | 86.5 | 82.4 | 82.49 | 86.50 | 86.50 | 82.49 | 82.49 | 86.5 | 86.5 | 82.4 | 82.49 |
| Ethylene Glycol | 7.00 | 6.10 | — | — | 7.00 | 6.10 | — | — | 7.00 | 6.10 | — | — |
| 1,4-butanediol | — | — | 10.73 | 9.47 | — | — | 10.73 | 9.47 | — | — | 10.73 | 9.47 |
| DETDA | — | 0.90 | — | 0.90 | — | 0.90 | — | 0.90 | — | 0.90 | — | 0.90 |
| Catalyst A | 2.0 | 2.0 | — | — | 2.0 | 2.0 | — | — | — | 0.90 | — | 0.90 |
| Catalyst B | — | — | 2.64 | 2.64 | — | — | 2.64 | 2.64 | 2.0 | 2.0 | — | — |
| DC 193 | 0.15 | 0.15 | 0.15 | 0.15 | 0.15 | 0.15 | 0.15 | 0.15 | 0.15 | 0.15 | 0.15 | 0.15 |
| Water | 0.35 | 0.35 | 0.35 | 0.35 | 0.35 | 0.35 | 0.35 | 0.35 | 0.35 | 0.35 | 0.35 | 0.35 |
| F 113 | 1.60 | 1.60 | 1.60 | 1.60 | 1.60 | 1.60 | 1.60 | 1.60 | 1.60 | 1.60 | 1.60 | 0.60 |
| Antistat A | 2.40 | 2.40 | — | — | 2.40 | 2.40 | — | — | 2.40 | 2.40 | — | — |
| Antistat B | — | — | 2.40 | 2:40 | — | — | 2.40 | 2.40 | — | — | 2.40 | 2.40 |
| Isocyanate Component | | | | | | | | | | | | |

TABLE IV-continued

| | Examples 15-24 | | | | | | | | | | | |
|---|---|---|---|---|---|---|---|---|---|---|---|---|
| Examples | 13 | 14 | 15 | 16 | 17 | 18 | 19 | 20 | 21 | 22 | 23 | 24 |
| Prepolymer of Example 10, Index | 100 | 100 | 100 | 100 | 100 | 100 | 100 | 100 | 100 | 100 | 100 | 100 |
| Properties | | | | | | | | | | | | |
| Density/g/cm$^3$ | 6.558 | 0.549 | 0.513 | 0.525 | 0.551 | 0.552 | 0.507 | 0.522 | 6.558 | 0.549 | 0.513 | 0.525 |
| Hardness, Shore A | 53 | 44 | 45 | 48 | 54 | 53 | 45 | 51 | 53 | 44 | 45 | 48 |
| Split Tear N/M | 15,935 | 17,125 | 14,744 | 16,320 | 16,705 | 12,538 | 13,343 | 13,869 | 15,935 | 17,125 | 14,744 | 16,320 |
| Graves Tear N/M (Die Tear) | 32,413 | 27,842 | 26,899 | 27,160 | 39,524 | 27,457 | 23,552 | 23,797 | 32.413 | 27,842 | 26,899 | 27,160 |
| Elongation, % | 253 | 407 | 387 | 397 | 393 | 407 | 337 | 360 | 253 | 407 | 387 | 39 |
| 100% Tensile Modulus, kPa | 1765 | 1758 | 1662 | 1620 | 1820 | 1627 | 1551 | 1482 | 1765 | 1758 | 1662 | 1620 |
| 200% Tensile Modulus, kPa | 2579 | 2537 | 2455 | 2344 | 2717 | 2379 | 2137 | 2200 | 2579 | 2537 | 2455 | 2344 |
| 300% Tensile Modulus, kPa | — | 3537 | 3489 | 3172 | 3703 | 3296 | 2413 | 3061 | — | 3537 | 3489 | 3172 |
| Tensile Strength kPa | 3027 | 5675 | 4827 | 4413 | 5455 | 5199 | 3020 | 3765 | 3027 | 5675 | 4827 | 4413 |
| Taber Abrasion mg loss/1000 cycles | 10.7 | 3.4 | 10.3 | 13.3 | 5.3 | 20.7 | 19.2 | 21.3 | 10.7 | 3.4 | 10.3 | 13.3 |
| Ross Flex (cycles to failure) @ −28° C. | 42.1K | 45.0K | 5.9K | 14.3K | >50.0K | 40.7K | 22.0K | 13.9K | 42.1K | 45.0K | 5.9K | 14.3K |

The embodiments of the invention in which an exclusive property or privilege is claimed are defined as follows:

1. A polyurethane-polyurea composition comprising the reaction product of
   (a) A urethane-modified quasi-prepolymer comprising the reaction product of a mixture of diphenylmethane diisocyanate and uretonimine modified diphenylmethane diisocyanate said mixture having from about 10 weight percent to about 20 weight percent free NCO, a polyol selected from the group consisting of a polyester polyol and a polyoxyalkylene polyether polyol, with a compound selected from the group consisting of a lactone having the formula:

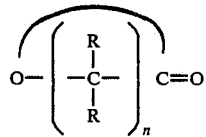

and a lactam having the formula:

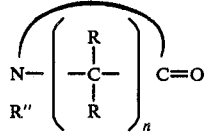

(b) an alkane diol or diamine chain extender and
   (c) catalyst, blowing agent, water, and surfactant wherein R, R' and R" are H, alkyl, aryl alkylaryl, heterocyclyl and cycloalkyl having 1 to 6 carbon atoms and n is an integer from 2 to 6.

2. The composition of claim 1 wherein the concentration of lactone or lactam is sufficient to depress the freezing point of the quasi-prepolymer to 0° C.

3. The composition of claim 1 wherein the concentration of lactone or lactam is from about 0.1 weight percent to about 20 weight percent based on the weight of the quasi-prepolymer.

4. The composition of claim 1 wherein the lactone is selected from the group consisting of β-propiolactone, γ-butyrolactone, γ- and δ-valerolactone, αγ-, βγ-, and γγ-dimethylbutyrolactone, α-ethyl-γ-methyl butyrolactone, and ε-caprolactone.

5. The composition of claim 1 wherein the lactam is selected from the group consisting of 2-pyrrolidone, N-methylpyrrolidone, 2-piperidone, N-ethylpyrrolidone, N-acetylpyrrolidone, N-cyclohexylpiperidone, N-ethyl piperidone, N-butyl-2-piperidone, γ-butyrolactam, ε-caprolactam, α-laurolactam.

6. A process for the preparation of a polyurethane-polyurea composition comprising reacting
   (a) a urethane-modified quasi-prepolymer comprising the reaction product of a mixture of diphenylmethane diisocyanate and uretonimine modified diphenylmethane diisocyanate said mixture having from about 10 weight percent to about 20 weight percent free NCO, a polyol selected from the group consisting of a polyester polyol and a polyoxyalkylene polyether polyol, with a compound selected from the group consisting of a lactone having the formula:

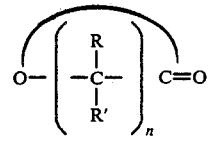

and a lactam having the formula:

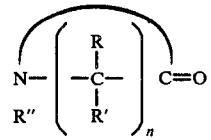

(b) an alkane diol or diamine chain extender and
   (c) catalyst, blowing agent, water, and surfactant wherein R, R' and R" are H, alkyl, aryl, alkylaryl, heterocyclyl and cycloalkyl having 1 to 6 carbon atoms and n is an integer from 2 to 6.

7. The process of claim 6 for the preparation of a polyurethane-polyurea composition wherein the concentration of lactone or lactam is sufficient to depress the freezing point of the quasi-prepolymer to 0° C.

8. The process of claim 6 for the preparation of a polyurethane-polyurea composition wherein the concentration of lactone or lactam is from about 0.1 weight percent to about 20 weight percent based on the weight of the quasi-prepolymer.

9. The process of claim 6 for the preparation of a polyurethane-polyurea composition wherein the lactone is selected from the group consisting of β-propiolactone, γ-butyrolactone, γ- and δ-valerolactone, αγ-, βγ-, and γγ-dimethylbutyrolactone, and α-ethyl-γ-methyl butyrolactone.

10. The process of claim 6 for the preparation of a polyurethane-polyurea composition wherein the lactam is selected from the group consisting of 2-pyrrolidone, N-methylpyrrolidone, and 2-piperidone, N-ethylpyrrolidone, N-acetylpyrrolidone, N-cyclohexylpiperidone, N-ethylpiperidone, N-butyl-2-piperidone, γ-butyrolactone, ε-caprolactone, and α-laurolactam.

11. A process for the preparation of a polyurethane-polyurea shoe sole comprising reacting
(a) a urethane-modified quasi-prepolymer comprising the reaction product of a mixture of diphenylmethane diisocyanate and uretonimine modified diphenylmethane diisocyanate said mixture having from about 10 weight percent to about 20 weight percent free NCO, a polyol selected from the group consisting of a polyester polyol and a polyoxyalkylene polyether polyol, with a compound selected from the group consisting of a lactone having the formula:

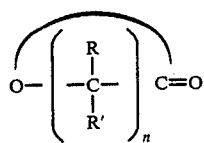

and a lactam having the formula:

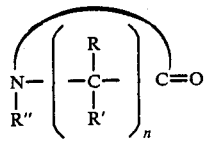

(b) an alkane diol or diamine chain extender and
(c) catalyst, blowing agent, water, and surfactant wherein R, R' and R" are H, alkyl, aryl, alkylaryl, heterocyclyl and cycloalkyl having 1 to 6 carbon atoms and n is an integer from 2 to 6.

12. The process of claim 11 for the preparation of a polyurethane-polyurea shoe sole wherein the concentration of lactone or lactam is sufficient to depress the freezing point of the quasi-prepolymer to 0° C.

13. The process of claim 11 for the preparation of a polyurethane-polyurea shoe sole wherein the concentration of lactone or lactam is from about 0.1 weight percent to about 20 weight percent based on the weight of the quasi-prepolymer.

14. The process of claim 11 for the preparation of a polyurethane-polyurea composition wherein the lactone is selected from the group consisting of β-propiolactone, γ-butyrolactone, γ- and δ-valerolactone, αγ-, βγ-, and γγ-dimethylbutyrolactone, and α-ethyl-γ-methyl butyrolactone.

15. The process of claim 11 for the preparation of a polyurethane-polyurea shoe sole wherein the lactam is selected from the group consisting of 2-pyrrolidone, N-methylpyrrolidone, and 2-piperidone, N-ethylpyrrolidone, N-acetylpyrrolidone, N-cyclohexylpiperidone, N-ethylpiperidone, N-butyl-2-piperidone, γ-butyrolactone, ε-caprolactone, and α-laurolactam.

16. The process of claim 11 for the preparation of a polyurethane-polyurea shoe sole whrein the polyester polyol is an adipate polyester having a mole ratio of ethylene glycol:butanediol in the adipate ester is from about 1:1 to about 2.5:1.

17. The process of claim 11 for the preparation of a polyurethane and a polyurethane-polyurea product wherein the polyester polyol is a reaction product of adipic acid and diethylene glycol.

18. The process of claim 11 for the preparation of a polyurethane and a polyurethane-polyurea product wherein the polyester polyol is a reaction product of adipic acid and 1,6-hexanediol or a mixture of 1,6-hexanediol and 1,4-butanediol.

* * * * *